United States Patent
Rieder et al.

(10) Patent No.: US 7,098,964 B2
(45) Date of Patent: Aug. 29, 2006

(54) APPARATUS AND METHOD FOR SLOPE-ENHANCEMENT OF SIGNAL TRANSITIONS IN TELEVISION PICTURES

(75) Inventors: Peter Rieder, München (DE); Marko Hahn, München (DE); Günter Scheffler, München (DE); Dirk Wendel, Unterhaching (DE)

(73) Assignee: MICRONAS GmbH, Freiburg (DE)

( * ) Notice: Subject to any disclaimer, the term of this patent is extended or adjusted under 35 U.S.C. 154(b) by 243 days.

(21) Appl. No.: 10/108,232

(22) Filed: Mar. 26, 2002

(65) Prior Publication Data

US 2003/0048367 A1    Mar. 13, 2003

(30) Foreign Application Priority Data

Mar. 26, 2001 (DE) .............................. 101 14 813

(51) Int. Cl.
*H04N 5/21* (2006.01)
*H04N 1/409* (2006.01)

(52) U.S. Cl. .................. 348/627; 348/625; 348/606; 382/266; 382/263; 358/532; 358/447

(58) Field of Classification Search ................ 348/627, 348/625, 606, 607, 622, 252, 253, 630, 631; 382/260, 263, 264, 266, 274, 275; 358/3.27, 358/3.26, 532, 447
See application file for complete search history.

(56) References Cited

U.S. PATENT DOCUMENTS

| | | | |
|---|---|---|---|
| 4,739,395 A | 4/1988 | Johanndeiter et al. | |
| 4,918,528 A | 4/1990 | Oohashi | 358/162 |
| 5,151,787 A | 9/1992 | Park | 358/162 |
| 5,412,432 A | 5/1995 | Hong | 348/625 |
| 5,668,606 A | 9/1997 | Okamoto et al. | 5/208 |
| 5,926,577 A * | 7/1999 | Kasahara et al. | 382/266 |
| 6,088,065 A | 7/2000 | Uchida | 348/625 |
| 6,278,494 B1 * | 8/2001 | Kanai et al. | 348/625 |
| 6,600,517 B1 * | 7/2003 | He et al. | 348/625 |
| 6,614,474 B1 * | 9/2003 | Malkin et al. | 348/252 |
| 6,618,097 B1 * | 9/2003 | Yamada | 348/625 |

(Continued)

FOREIGN PATENT DOCUMENTS

EP    0 457 931    11/1991

(Continued)

OTHER PUBLICATIONS

Kazuhiro Ohara and Adam Kunzman, "Video Processing Technique for Multimedia HDTV with Digital Micro-Mirror Array," IEEE Transactions on Consumer Electronics: Aug. 1999; pp. 604-610.

*Primary Examiner*—David Ometz
*Assistant Examiner*—Jean W. Désir
(74) *Attorney, Agent, or Firm*—O'Shea, Getz & Kosakowski, P.C.

(57) ABSTRACT

A time-discrete picture signal is formed from an analog picture signal, such as a luminance signal or a chrominance signal. Corresponding to the time-discrete picture signal, a time-discrete filter signal is formed, specifically a so-called "peaking signal," which has a sequence of peaking signal values, of which one value each is associated with one signal value of the time-discrete picture signal. The discrete peaking signal is formed by a digital peaking filter from the discrete picture signal or by an analog peaking filter from the analog picture signal during subsequent sampling of the analog peaking signal. The peaking filter increases the amplitude of selected frequency components of the picture signal.

9 Claims, 10 Drawing Sheets

U.S. PATENT DOCUMENTS 6,658,165 B1 * 12/2003 Choi ........................ 382/274
6,700,626 B1 * 3/2004 Stessen et al. ............. 348/627
6,714,258 B1 * 3/2004 Stessen et al. ............. 348/607
6,774,937 B1 * 8/2004 Kobayashi ............... 348/222.1

FOREIGN PATENT DOCUMENTS

| | | | | |
|---|---|---|---|---|
| EP | 0 472 782 A1 | 3/1992 | ............... | 15/68 |
| EP | 0554781 A1 | 8/1993 | | |
| EP | 0558017 A2 | 9/1993 | | |
| EP | 0901103 A2 | 3/1999 | | |
| JP | 60201484 | 10/1985 | ............... | 9/36 |

* cited by examiner

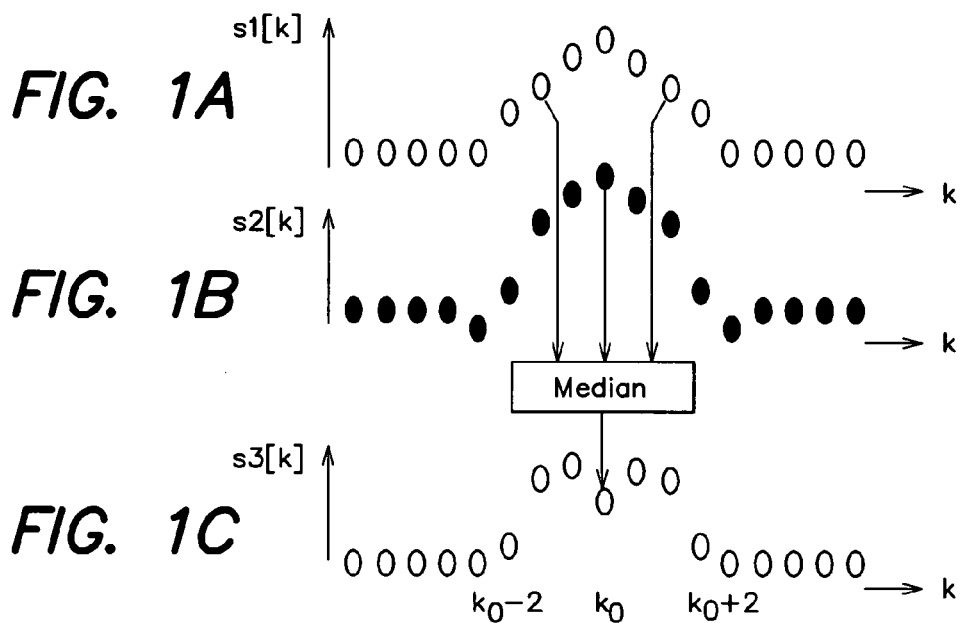
FIG. 1A
FIG. 1B
FIG. 1C
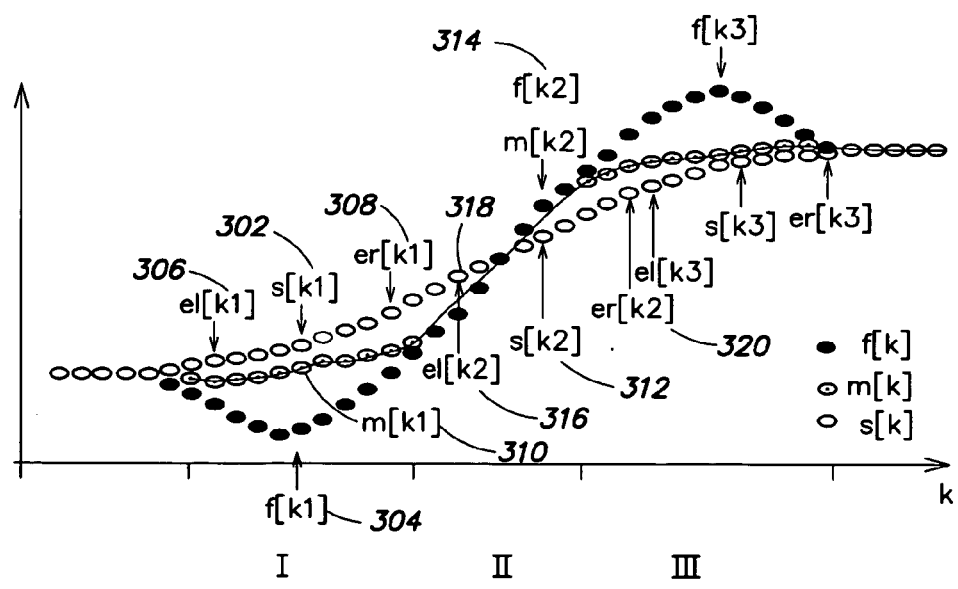
FIG. 3

APPARATUS AND METHOD FOR SLOPE-ENHANCEMENT OF SIGNAL TRANSITIONS IN TELEVISION PICTURES

BACKGROUND OF THE INVENTION

The present invention relates to the field of television signal processing, and in particular to an apparatus and method for improving the sharpness of a television picture that is formed from at least one television signal.

A conventional television picture is formed from a luminance signal that contains brightness information, and two chrominance signals that contain color information. These signals are referred to hereinafter as picture signals.

The transmission bandwidth of the luminance signal and the chrominance signals is fixed, and the bandwidth of the chrominance signals is narrower than the bandwidth of the luminance signal. This bandwidth limitation reduces the sharpness of the television picture. The color and brightness information is present line-by-line in each picture signal. That is, chronologically successive values for the picture signals contain the brightness or color information of the successive pixels in a line of the television picture. A change in brightness or color between adjacent pixels of a line results from an increase or decrease over time in the amplitude of the given picture signal. The band width limitation in the transmission of the pictures signals limits the steepness of the slopes of the picture signals so that random color or brightness differences between adjacent pixels cannot be displayed. This bandwidth limitation is especially evident in color edges or brightness edges in a picture in which the brightness transition or color transition proceeds continuously, and not abruptly as desired. Due to the narrower bandwidth of the chrominance signals, the transition at the color edges is slower. That is, it extends over a greater number of adjacent pixels than does the transition for brightness edges.

A known approach to enhancing the slopes of the picture signals is to filter the picture signals with a peaking filter. The peaking filter amplifies the amplitude of high-frequency components. This process can be accomplished, for example, by filtering the picture signal with a high-pass filter or a bandpass filter, and subsequently adding the picture signal and filter output signal.

One problem with slope enhancement of the signal slopes by the peaking method is that overshoots and undershoots occur before and after the slopes of the output signal that distort the brightness or color of the pixels before and after the brightness or color edges.

European Patent Application 0 224 302 A1 describes a circuit for increasing the sharpness of color edges, the circuit determining the slope of the chrominance signal and driving a slope enhancement circuit when the specified slope value is exceeded, the circuit generates a chrominance signal with a steepened slope.

European Patent Application 0 457 931 A1 describes a device and method for color edge improvement. Here the turning points in a chrominance signal are determined. When a turning point occurs, one slope in the region of the turning point is replaced by a steeper slope according to the known method.

The reference Ohara, Kunzmann: "*Video Processing Technique for Multimedia HDTV with Digital Micro-Mirror Array*", IEEE Transactions on Consumer Electronics, 8–99, Vol. 45, No. 3, pp. 604 et seq. discloses a method for digitally processing a picture signal in which initially a time-discrete picture signal and a signal filter corresponding to the time-discrete picture signal obtained by a digital peaking are determined from the analog picture signal. The following are taken into account with each signal value of the picture signal: a "left" signal value lying a specified number of places before the signal value and a "right" signal value lying a specified number of places after the signal value, and the peaking signal value corresponding to the signal value. If the peaking signal value lies within an interval defined by the left signal value and the right signal value, the peaking signal value is output as the picture signal value. If the peaking signal value lies outside this interval, the left signal value or the right signal value are output as the picture signal value. This method in which the positions of the limits of the interval are fixed for the comparison with the peaking signal value may result in problems, especially for signal curves in which the signal has an oscillating pattern as shown in FIGS. 1A–1C. FIG. 11A is a plot of a time-discrete picture signal s1[k] which was obtained by sampling a continuous signal; FIG. 1B is the curve of an associated peaking signal s2[k]; and FIG. 1C shows a picture signal s3[k] resulting from the known method.

According to this prior art technique, to form a modified picture signal value $s3[k_0]$, the associated peaking signal value $s2[k_0]$ and a left picture signal value $s1[k_0-2]$, and aright signal value $s1[k_0+2]$ are compared. The peaking signal value $s2[k_0]$ lies in the signal curve in the example outside an interval specified by the left and right picture signal values $s1[k_0-2]$ and $s1[k_0+2]$ so that the interval limit $s1[k_0-2]$ or $s1[k_0+2]$ that lies closer to the peaking signal value $s2[k_0]$ is output as the modified picture signal value $s3[k_0]$. In the previous picture signal value $s1[k_0-1]$ and the following picture signal value $s1[k_0+1]$, the associated peaking signal value $s2[k_0-1]$ or $s2[k_0+1]$ lie within the interval specified by the limits $s1[k_0-3]$ and $s1[k_0+1]$ or $s1[k_0-1]$ and $s1[k_0+3]$ so that the peaking signal value $s2[k_0-1]$ and $s2[k_0+1]$ are selected as the associated picture signal value $s3[k_0-1]$ and $s3[k_0+1]$. The selection of the peaking signal values $s2[k_0-1]$ and $s2[k_0+1]$ as picture signal values $s3[k_0-1]$ and $s3[k_0+1]$, and the signal value $s1[k_0-2]$ or $s1[k_0-2]$ as the signal value $s3[k_0]$ results in an unwanted "collapse" of the picture signal value $s3[k_0]$ relative to adjacent values.

Therefore, there is a need for an apparatus and method for increasing the contrast of a television picture that is formed from at least one picture signal.

SUMMARY OF THE INVENTION

A time-discrete picture signal is formed from an analog picture signal, such as a luminance signal or a chrominance signal. Corresponding to the time-discrete picture signal, a time-discrete filter signal is formed, specifically a so-called "peaking signal," which has a sequence of peaking signal values, of which one value each is associated with one signal value of the time-discrete picture signal. The discrete peaking signal is formed by a digital peaking filter from the discrete picture signal or by an analog peaking filter from the analog picture signal during subsequent sampling of the analog peaking signal. The peaking filter increases the amplitude of selected frequency components of the picture signal.

From the discrete picture signal and the peaking signal, a modified discrete picture signal is formed that is either converted by a digital-to-analog converter to an analog picture signal to generate the television picture, or is digitally stored. To generate a signal value of the modified picture signal, a picture signal value is selected and at least one local extreme value of a sequence of successive picture signal values is determined. This sequence of successive picture signal values containing the selected picture signal value. The picture signal value of the modified picture signal is determined as a function of the (at least one) local extreme that has been determined.

The selected picture signal value is output as a modified picture signal value when the picture signal value is a local extreme. If the selected picture signal value is not a local extreme, a first local extreme and a second local extreme are determined based on the selected picture signal value. The first local extreme is the local extreme of a sequence of successive picture signal values located chronologically before the selected picture signal value. The second local extreme is the local extreme of a sequence of successive picture signal values located chronologically after the selected picture signal value. If the peaking signal value corresponding to the selected picture signal value is located within an interval specified by the first and second local extremes, the peaking signal value is output as the modified picture signal value. If the corresponding peaking signal value lies outside the interval specified by the local extreme, the local extreme whose amount-specific interval from the peaking signal value is smaller is output as the modified picture signal value.

The length of the sequence within which the first local extreme and the second local extreme are determined, is preferably limited. One embodiment provides that the sequence of picture signal values before the selected picture signal value within which the first local extreme is determined has as many values as the sequence of picture signal values after the selected picture signal value within which the second local extreme is determined.

To provide a modified picture signal value for each picture signal value, the steps of selecting the respective picture signal value, and determining (at least one) local extreme and one modified picture signal value as a function of the local extreme, are performed for each picture signal value.

The device includes a sampling device to provide a discrete television signal from the television signal, a memory arrangement to store a sequence of successive television signal values, a filter arrangement to provide a filtered signal from the discrete television signal, an arrangement for determining at least one extreme of the stored sequence of television signals, and an arrangement to provide a modified television signal value as a function of the (at least one) extreme that has been determined.

Preferably, the arrangement to determine the (at least one) extreme determines the relative position of the (at least one) extreme relative to the selected television signal value and at least one multiplexer to which the position of the (at least one) extreme and the stored television signal values are fed.

These and other objects, features and advantages of the present invention will become more apparent in light of the following detailed description of preferred embodiments thereof, as illustrated in the accompanying drawings.

BRIEF DESCRIPTION OF THE DRAWING

FIGS. 1A–1C are plots of a time-discrete picture signal s1[k], the curve of an associated peaking signal s2[k], and a picture signal s3[k] resulting from the known method;

FIG. 3 is a plot of a discrete picture signal s[k], a peaking signal f[k], and a modified picture signal m[k] formed from the picture signal and the peaking signal;

DETAILED DESCRIPTION OF THE INVENTION

Figure 2:
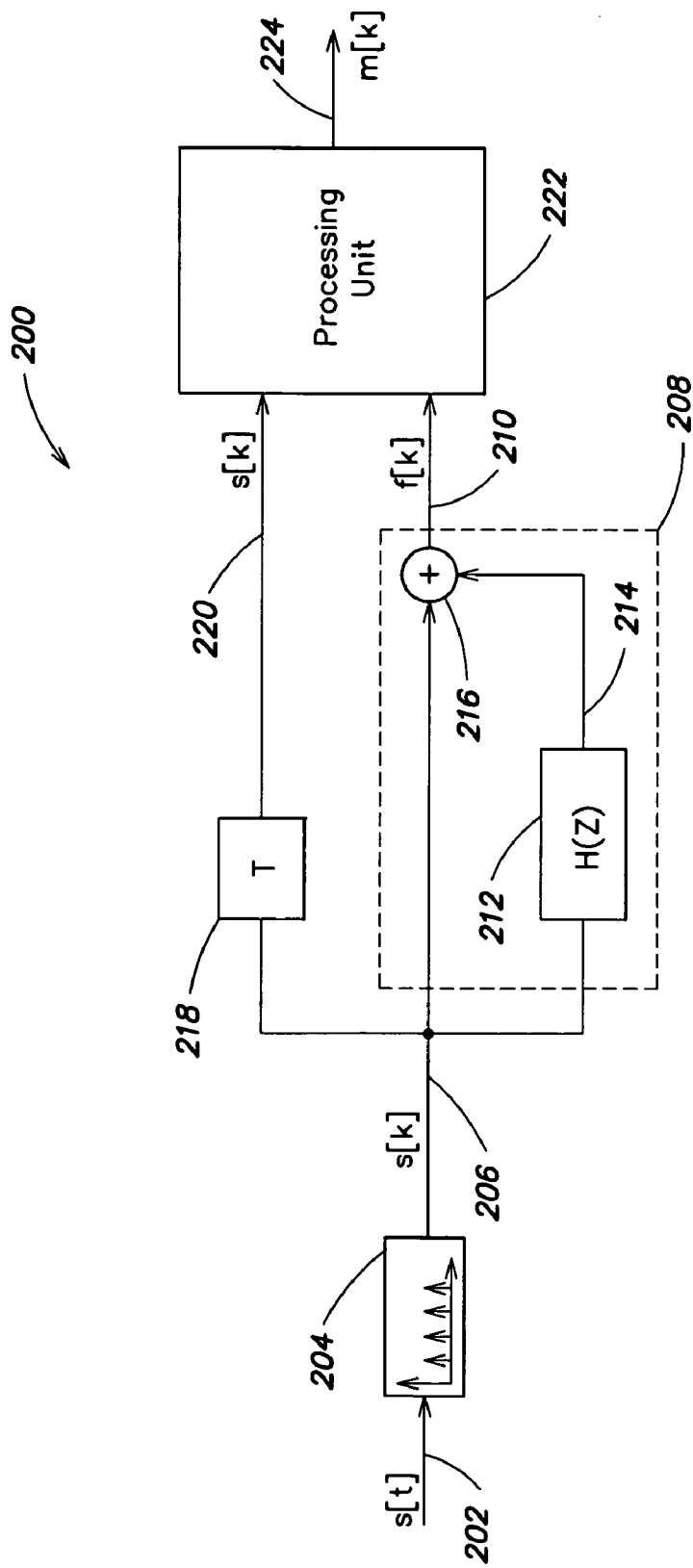
FIG. 2 is a block diagram illustration of a device for generating a modified picture signal.

FIG. 2 is a block diagram illustration of a device 200 for generating a modified picture signal. The device 200 increases the slopes of a television signal formed from at least one picture signal. A picture signal s(t) on a line 202 is input to an analog-to-digital converter (ADC) 204, which provides discrete picture signal s[k] on a line 206. The picture signal s(t) may be a luminance signal or a chrominance signal. The discrete picture signal on the line 206 is input to a peaking filter 208, which provides a peaking signal f[k] on a line 210. The peaking signal f[k] on the line 210 is derived from the discrete picture signal on the line 206 by increasing the amplitude associated with selected frequency components. The peaking filter 208 includes a bandpass filter or a high-pass filter 212 with a transfer function H[z] that provides a filtered signal on line 214. The peaking filter 208 also includes a summer 216 that sums the discrete picture signal s[k] on the line 206 and the filtered signal on the line 214 and provides the peaking signal on the line 210.

The discrete picture signal s[k] on the line 206 is also input to a delay element 218, which provides a delayed signal on a line 220. The peaking signal on the line 210 and the delayed signal on the line 220 are input to an processing unit 222 that provides a modified discrete picture signal m[k] on a line 224. The peaking signal f[k] on the line 210 has a corresponding signal value for each signal value of picture signal s[k] on the line 220. Therefore, the delay element 218 delays the signal on the line 206 to account for the processing delay associated with the peaking filter 208, to ensure the corresponding signal values for the picture signal s[k] and the peaking signal f[k] are fed simultaneously to the processing unit 222.

In addition to the simply constructed peaking filter 26 shown in FIG. 2, any other known filters may be employed in which selected frequency components of an input signal are amplified.

FIG. 3 is a plot of a curve for the discrete picture signal s [k] and the associated peaking signal f[k] on the lines 220,210 (FIG. 2) respectively plotted against the discrete counting variable k. FIG. 3 illustrates that the peaking signal f[k] rises more steeply in the region in which the picture signal s[k] rises slowly, thereby increasing the sharpness of a picture resulting from the peaking signal f[k] as compared with the picture resulting from the picture signal s[k]. Nevertheless, the peaking signal f[k] shows an undershoot before the rise and an overshoot after the rise, the result being a distortion in the reproduction of the brightness or color of the television picture.

Referring still to FIG. 3, a modified picture signal m[k] is formed from the picture signal s[k] and the peaking signal f[k] by the processing unit 222 (FIG. 2). In the plot of FIG. 3, the region of the steep rise of the peaking signal f[k] is taken by the processing unit 222 (FIG. 2) as the modified picture signal m[k], and the overshoots and undershoots of peaking signal f[k] are cut off during formation of the modified picture signal m[k].

Referring to FIGS. 2 and 3, the processing unit 222 (FIG. 2) selects sequentially for each signal value of the picture signal s[k], at least one local extreme for each sequence of successive picture signal values that contain the selected signal value. If the selected picture signal value itself is the local extreme, then the selected picture signal value is output as the modified picture signal value. If the selected picture signal value is not a local extreme, then a first local extreme and a second local extreme are determined for the selected picture signal value. The first local extreme is determined from the picture signal values lying before the selected picture signal value, and the second local extreme is determined from the picture signal values lying after the selected picture signal value. If the peaking signal value corresponding to the selected picture signal value lies within an interval formed by the first local extreme and the second local extreme, the corresponding peaking signal value is output as the modified picture signal value. If the corresponding peaking signal value lies outside this interval defined by the local extremes, then a determination is made as to which value of the two local extremes lies closer to the corresponding peaking signal value and this local extreme is then output as the modified picture signal value.

The plot shown in FIG. 3 of the sequence of the modified picture signal m[k] may be subdivided into three sections I, II, III. In section I, a picture signal value s[k1] 302 and a corresponding peaking signal value f[k1] 304 are highlighted. The picture signal value s[k1] 302 is not, in this case, a local extreme since picture signal s[k] rises continuously in the region of this picture signal value s[k1] 302. Thus, based on picture signal value s[k1] 302 a first local extreme el[k1] 306 is determined from a sequence of picture signal values located before picture signal value s[k1] 302. The number of values in this sequence is limited to four in the embodiment of FIG. 3. Local extreme el[k1] 306 of this continuously rising sequence is thus formed by the picture signal value s[k1-4]. Similarly, a local extreme of a sequence of picture signal values located before signal value s[k1] 302 is formed by the picture signal value s[k1+4]. Corresponding peaking signal value f[k1] 304 is smaller than first extreme el[k1] 306 and smaller than the second extreme er[k1] 308, and thus does not lie within an interval formed by the these two local extremes el[k1] 306 and er[k1] 308. The amount for the amplitude value of peaking signal value f[k1] 304 thus lies closer to first local extreme el[k1] 306 so that the value of first local extreme el[k1] 306 is output as the modified picture signal value m[k1] 310.

Since in the chronological sequence of the signal values first local extreme el[k1] 306 lies to the left of picture signal value s[k1] 302, this extreme is subsequently called the left local extreme, while the second local extreme is analogously called the right local extreme.

In section II, a picture signal value s[k2] 312 and its associated corresponding peaking signal value f[k2] 314 are indicated. A left extreme el[k2] 316 for this picture signal value s[k2] 312 is formed by picture signal value s[k2−4] 318, and a right local extreme er[k2] 320, is formed by picture signal value s[k2+4]. The corresponding peaking signal value f[k2] 314 lies within the interval formed by local extremes el[k2] 316 and er[k2] 320 so that peaking signal value f[k2] 314 is output as the modified picture signal value m[k2].

In section III, a picture signal value s[k3] and its associated corresponding peaking signal value f[k3] are highlighted. The right local extreme er[k3] for this picture signal value s[k3] is formed from the picture signal value s[k3+4], while the left local extreme el[k3] for this picture signal value s[k3] is formed by picture signal value s[k3−4]. The corresponding peaking signal value f[k3] lies outside the interval formed by the local extremes el[k3] and er[k3]. The value of right local extreme er[k3] is output as the modified picture signal value m[k3] since the right local extreme lies closer to corresponding peaking signal value f[k3].

Figure 4:
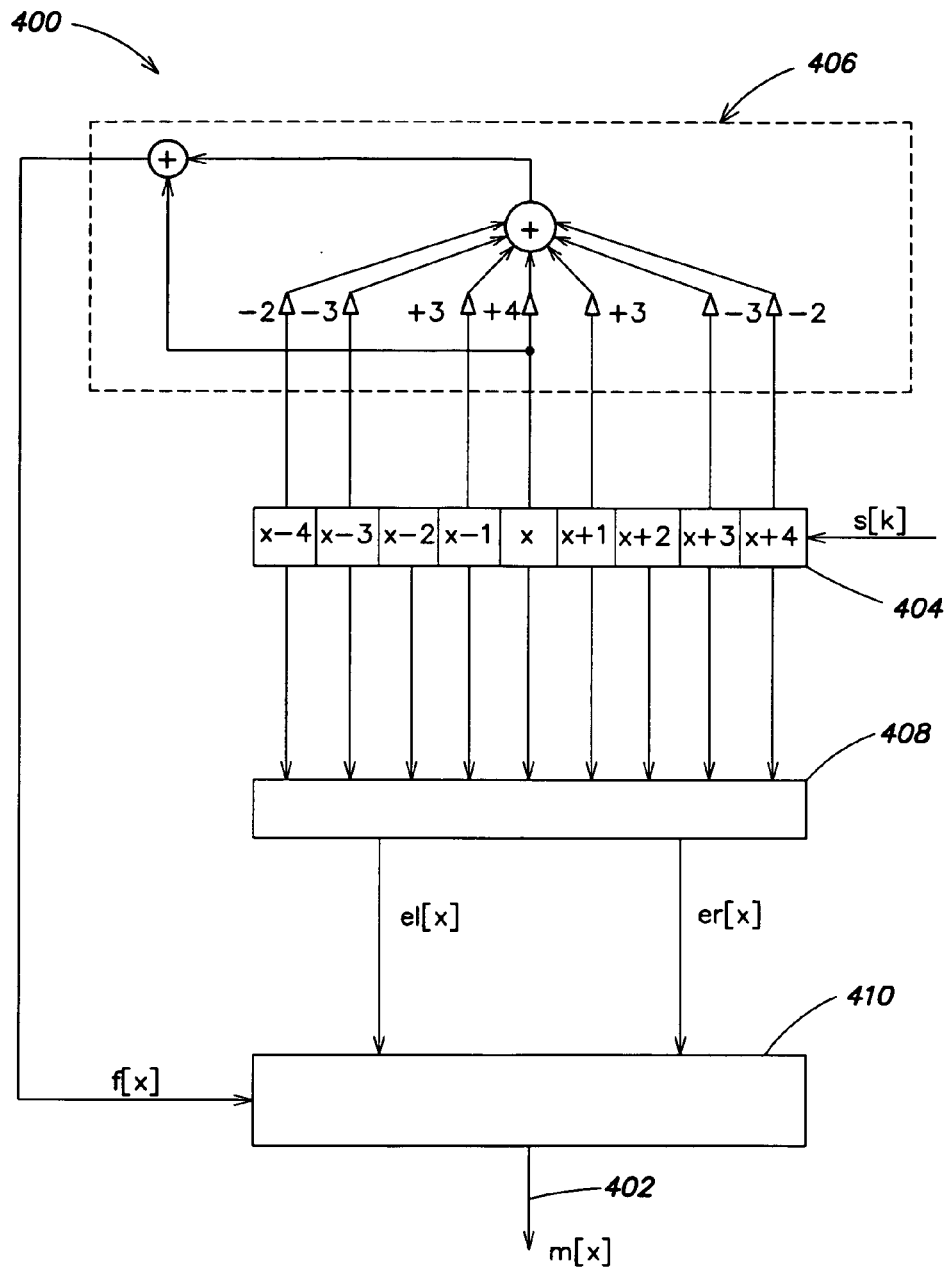
FIG. 4 illustrates a device for generating a modified picture signal value m[x] for selected picture signal value s[k]

FIG. 4 illustrates a device 400 for generating a modified picture signal m[x] on a line 402. The variable x below stands for any given value for the discrete counting variable from a sequence of values for the picture signal s[k]. The device 400 includes a shift register 404 in which a plurality of (e.g., nine) successive picture signal values s[x−4], s[x−3], s[x−2], s[x−1], s[x], s[x+1], s[x+2], s[x+3], s[x+4] are stored in this embodiment. The output modified picture signal value m[x] here is the output signal value for picture signal value s[x]. The device 400 also includes a digital peaking filter 406, the transfer function P[z] of which is P[z]=1+H[z]. In one embodiment H[z] is:

$$H[z] = -2z^{-4} - 3z^{-3} + 3z^{-1} + 4z^{0} + 3z^{1} - 3z^{3} - 2z^{4}$$

For each signal value s[x] of picture signal s[k], a corresponding peaking signal value f[x] is provided at the output of the peaking filter.

The values of picture signal s[k] stored in shift register 406 are fed to a unit 408 that determines right and left extremes el[x] and er[x]. The extremes el[x], er[x] are provided at an output of unit 408 and fed to a unit 410 to form modified picture signal value m[x] on the line 402 from local extremes el[x], er[x] and peaking signal value f[x].

This determination of the local extremes for a selected picture signal value s[x] is explained below in more detail, the assumption being made for the purposes of the explanation that the length of the sequence of picture signal values within which the local extremes are determined has a maximum of nine picture signal values.

Figure 5:
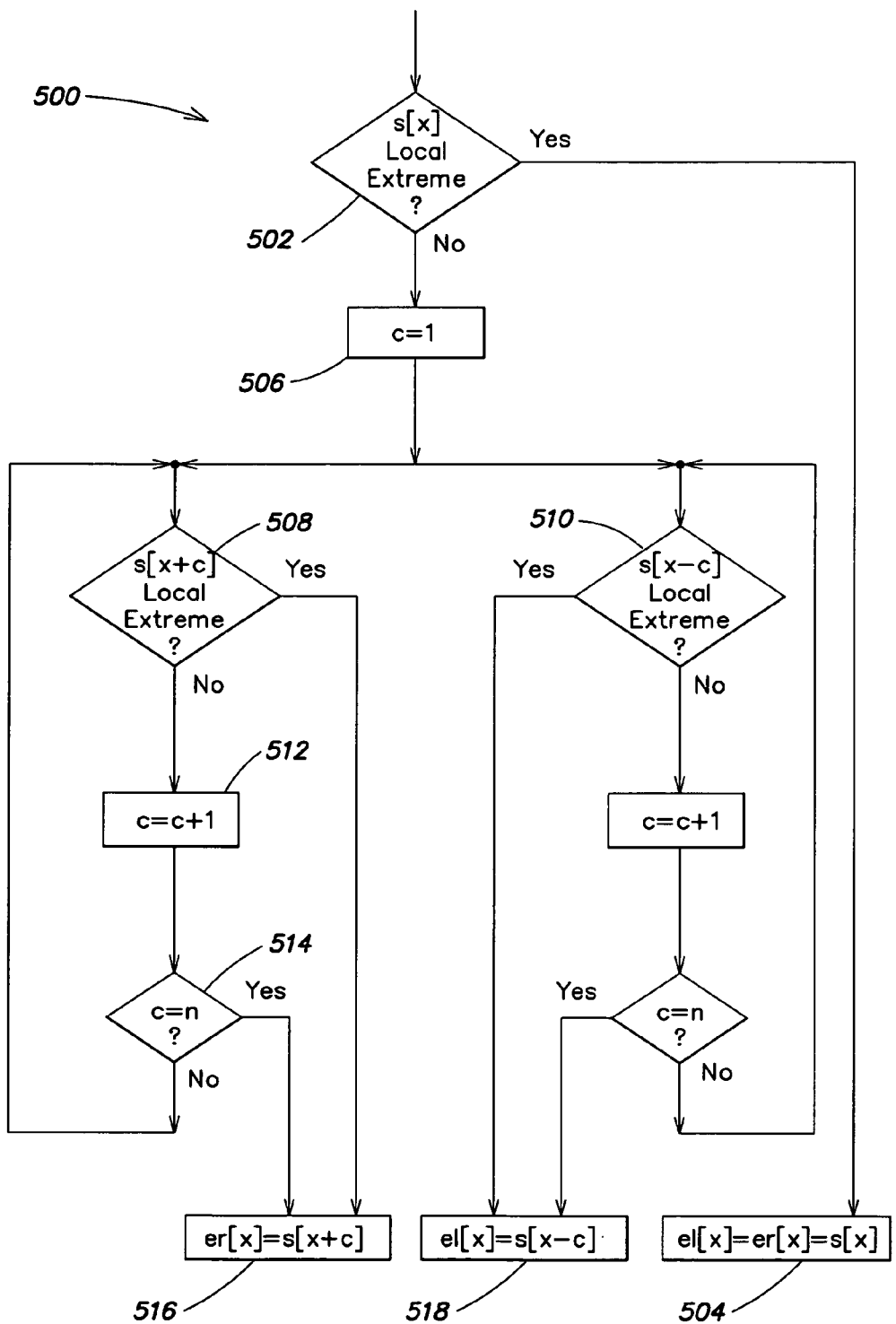
FIG. 5 is a flow chart illustration of processing to determine local extremes.
Figure 6A:
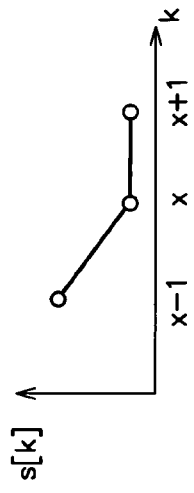
FIGS. 6A–6F are plots of selected signal curves of a picture signal to illustrate the process of determining local extremes.
Figure 6B:
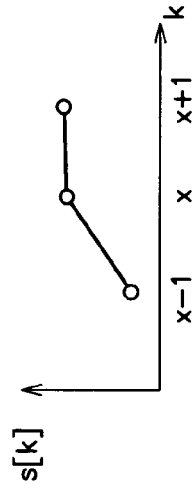
Figure 6C:
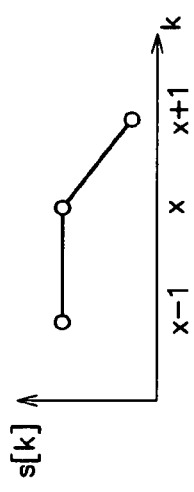
Figure 6D:
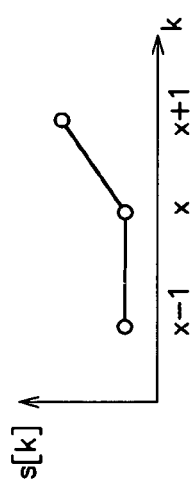
Figure 6E:
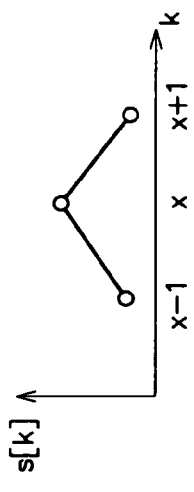
Figure 6F:
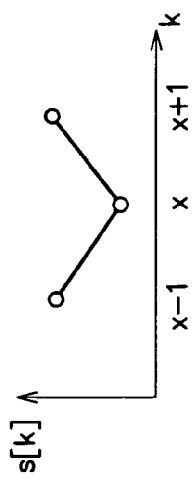
Figure 7A:
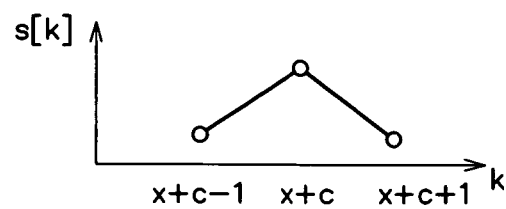
FIGS. 7A–7D are plots of selected signal curves in which there is a local extreme of a sequence of picture signal values, which sequence precedes the selected picture signal.
Figure 7B:
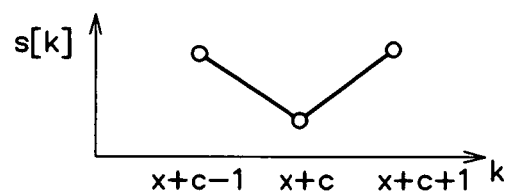
Figure 7C:
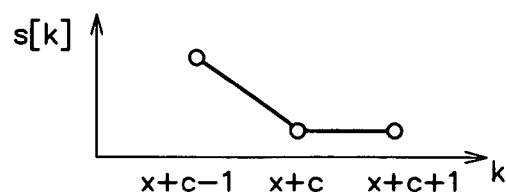
Figure 7D:
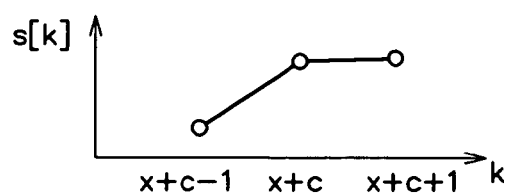
Figure 8A:
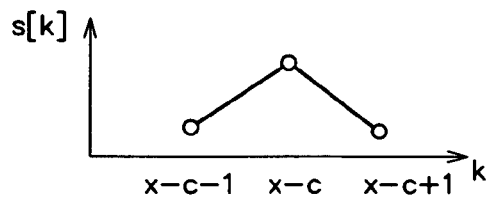
FIGS. 8A–8D are plots of selected signal curves in which there is a local extreme of a sequence of picture signal values, which sequence follows the selected picture signal.
Figure 8B:
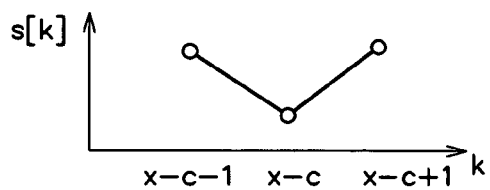
Figure 8C:
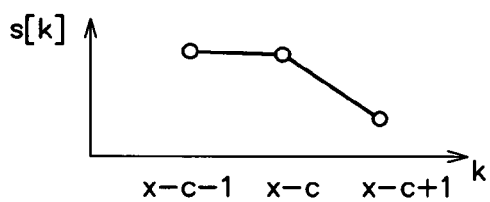
Figure 8D:
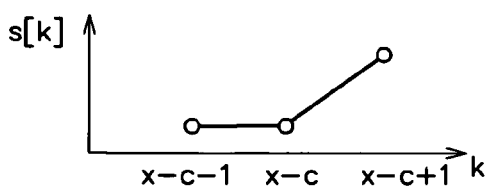

FIG. 5 is a flow chart illustration of processing steps 500 performed in unit 408 (FIG. 4) to determine the local extremes. Test 502 determines whether the selected picture signal value s[x] represents a local extreme. FIGS. 6A–6F illustrate various instances of successive signal values in which the selected picture signal value s[x] represents a local extreme. Specifically, the test 502 determines that the selected picture signal value represents a local extreme when:

s[x] is greater than s[x−1] and s[x+1],
s[x] is less than s[x−1] and s[x+1],
s[x] equals s[x−1] and is greater than s[x+1],
s[x] equals s[x−1] and is less than s[x+1],
s[x] equals s[x+1] and is less than s[x−1], or s[x] equals s[x+1] and is greater than s[x−1].

The term s[x−1] designates here a value lying before signal value s[x], while s[x+1] designates a value after signal value s[x]. When the test 502 determines that there is a local extreme, step 504 is performed so unit 410 (FIG. 4) outputs the value of picture signal value s[x] as the left extreme el[x] and as the right extreme er[x]. If test 502 determines that there is no local extreme, step 506 is performed to set a count value C equal to one, and then tests are performed to determine whether the right adjacent value s[x+1] or the left adjacent value s[x−1] represents a local extreme. Specifically, test 508 checks for the right extreme er[x], and test 510 checks for the left extreme el[x].

As an example of a right adjacent value s[x+c] of picture signal value s[x], FIGS. 7A–7D show signal configurations in which the right adjacent value s[x+c] represents a local extreme. Referring to FIGS. 5 and 7A–7D, the test 508 determines that the right adjacent value s[x+c] is a local extreme when:

s[x+c] is greater than its right adjacent value s[x+c+1] and than its left adjacent value s[x−c−1], s[x+c] is less than its right adjacent value s[x+c+1] and than its left adjacent value s[x+c−1], s[x+c] equals its right adjacent value s[x+c+1] and is less than its left adjacent value s[x+c−1], or s[x+c] equals its right adjacent value s[x+c+1] and is greater than its left adjacent value s[x+c−1].

The determination whether a right adjacent value s[x+c] represents a local extreme for signal value s[x] is performed for successive right adjacent values s[x+c] until a local extreme is determined, or until the limit of the analysis interval has been reached. To do this, a counting variable C is set to one in the step 506 at the beginning of the determination of the right local extreme, then each signal value is incremented in step 512 by one after the test 508. For the values s[x+c], the determination as to whether these represent a local extreme continues until one of the values is a local extreme or until test 514 determines the limit of the analysis interval is reached. The variable defining the limit of the analysis interval being designated as n in the flow diagram of FIG. 5, wherein N is equal to four in the embodiment of FIG. 4.

If test 508 determines a right adjacent value s[x+c] is a local extreme, then in step 516 right extreme er[x] is set equal to the value s[x+c] that forms the local extreme. Similarly, the test 510 determines if a left adjacent value s[x−c] is a local extreme, specifically for successive left adjacent values starting from signal value s[x] until a local extreme has been determined or until the limit of the analysis interval is reached, the limit of the analysis interval being defined in the previous example by the picture signal value s[x−4]. Step 518 sets left extreme el[x] equal to the value s[x−c] that forms the local extreme.

FIGS. 8A–8D show the signal configuration in which a left adjacent value s[x−c] of picture signal value s[x] represents a left extreme. Specifically, the test 510 determines that the selected picture signal value represents a left extreme when:

s[x−c] is greater than its left adjacent value s[x−c−1] and its right adjacent value is s[x−c+1], s[x−c] is less than its left adjacent value s[x−c−1] and its right adjacent value is s[x−c+1], s[x−c] equals its left adjacent value s[x−c−1] and is greater than its right adjacent value s[x−c+1], or s[x−c] equals its left adjacent value s[x−c−1] and is less than its right adjacent value s[x−c+1].

Figure 9A:
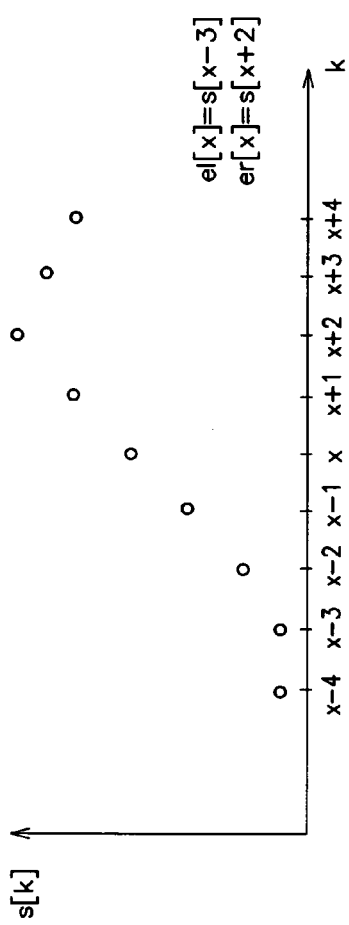
FIGS. 9A–9B are plots of selected sections of the signal curves for a picture signal that illustrate the determination of the local extremes.

To illustrate the technique for determining local extremes, FIG. 9A is a plot of a sequence of picture signal values s[x−4] . . . s[x+4], where signal value s[x] in this sequence does not represent an extreme. Starting with s[x], a right local extreme is determined which is found in signal value s[x+2], and a left local extreme is determined which is found in signal value s[x−3]. The signal values lying to the right of s[x+2] and the signal value lying to the left of s[x−3] are no longer considered in the determination of the extreme.

Figure 9B:
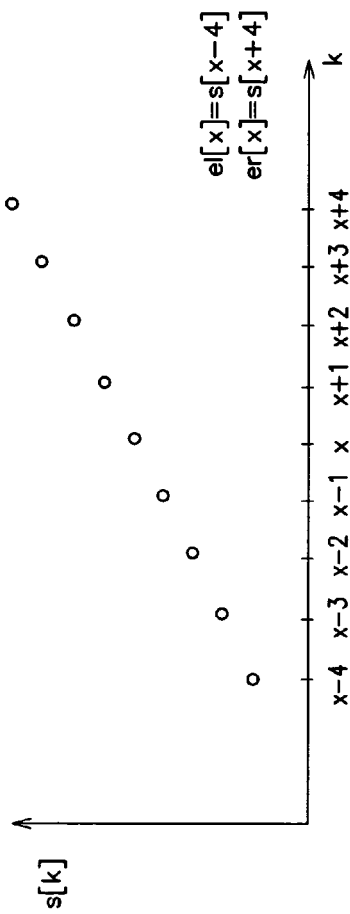

FIG. 9B is a plot of a sequence in which signal s[k] rises continuously between signal values s[x−4] and s[x+4], such that s[x−4] forms the left local extreme and s[x+4] forms the right local extreme.

Figure 10:
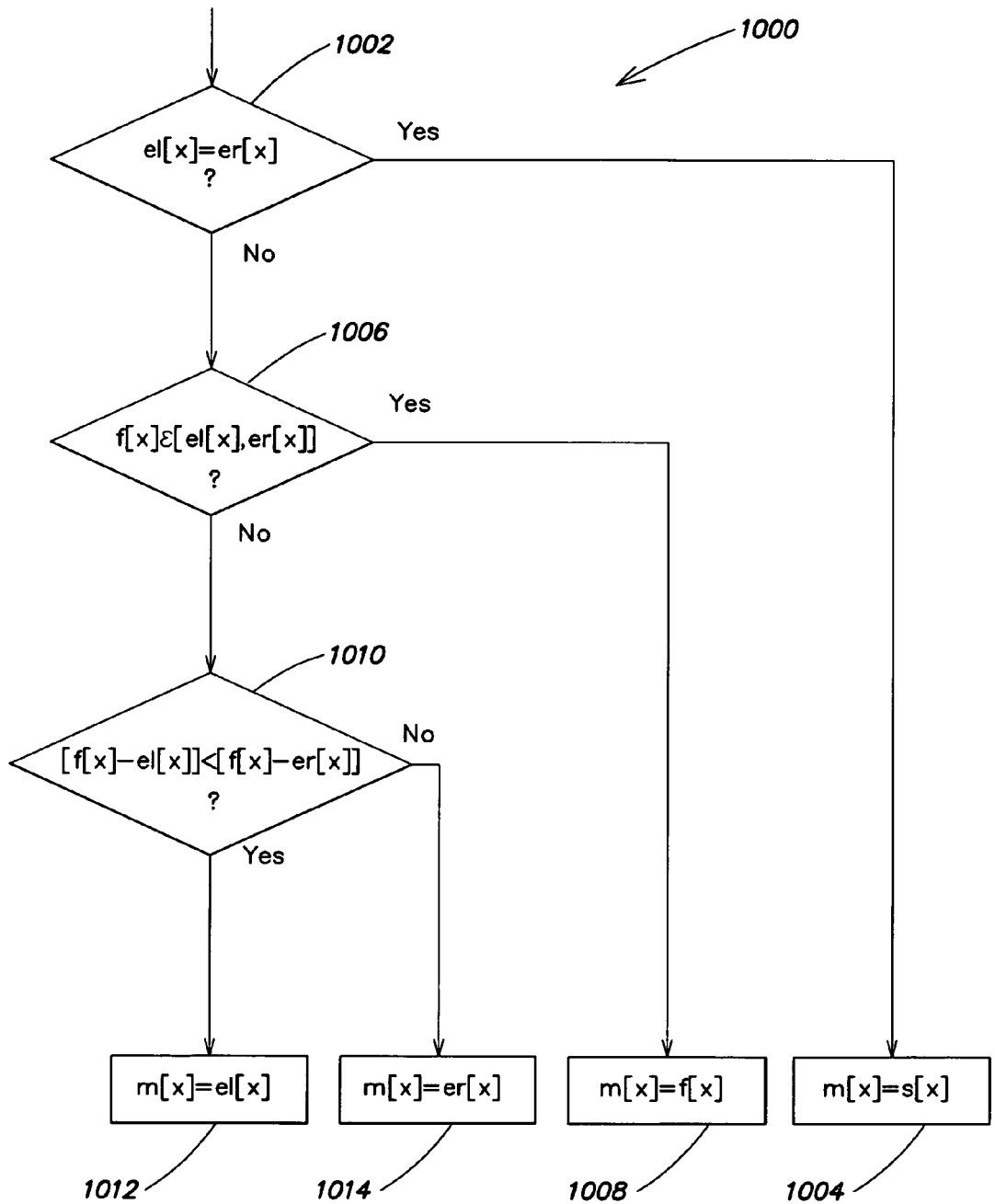
FIG. 10 is a flow chart illustration of processing to determine the picture signal values of the modified picture signal from the local extremes, the peaking signal value, and the selected picture signal value.

FIG. 10 is a flow diagram of processing steps 1000 performed by unit 410 (FIG. 4) to determine modified picture signal value m[x] from local extremes el[x], er[x] and corresponding peaking signal value f[x]. A test 1002 determines whether the value of left local extreme el[x] is equal to the value of right local extreme er[x]. If so, the assumption is made that picture signal value s[x] itself represents a local extreme, with the result that in step 1004 picture signal value s[x] is applied as the modified picture signal value m[x]. Otherwise, test 1006 checks if corresponding peaking signal value f[x] is contained in an interval formed by left local extreme el[x] and right local extreme er[x]. If so, corresponding peaking signal value f[x] is output as the modified picture signal value m[x] in step 1008. If the value is not contained in the interval, test 1010 compares the value of the difference between peaking signal value f[x] and left local extreme el[x], and the value of the difference between peaking signal value f[x] and right local extreme er[x]. If the difference between peaking signal value f[x] and left local extreme el[x] is less than the difference between peaking signal value f[x] and right local extreme er[x], the value of left local extreme el[x] is output in step 1012 as the modified filter signal value m[x]. Otherwise, the value of right local extreme er[x] is output in step 1014 as the modified filter signal value m[x].

In the above-described embodiment for forming modified picture signal values m[x], to determine local extremes three successive picture signal values are always compared, where a local extreme of selected picture signal value s[x] is present when one of the configurations shown in FIGS. 6A–6F is present, where a right local extreme of one value s[x+c] following picture signal value s[x] is present when one of the signal configurations in FIGS. 7A–7D is present, and where a left local extreme of a value s[x−c] preceding picture signal value s[x] is present when one of the signal configurations in FIGS. 8A–8D is provided.

Figure 11:
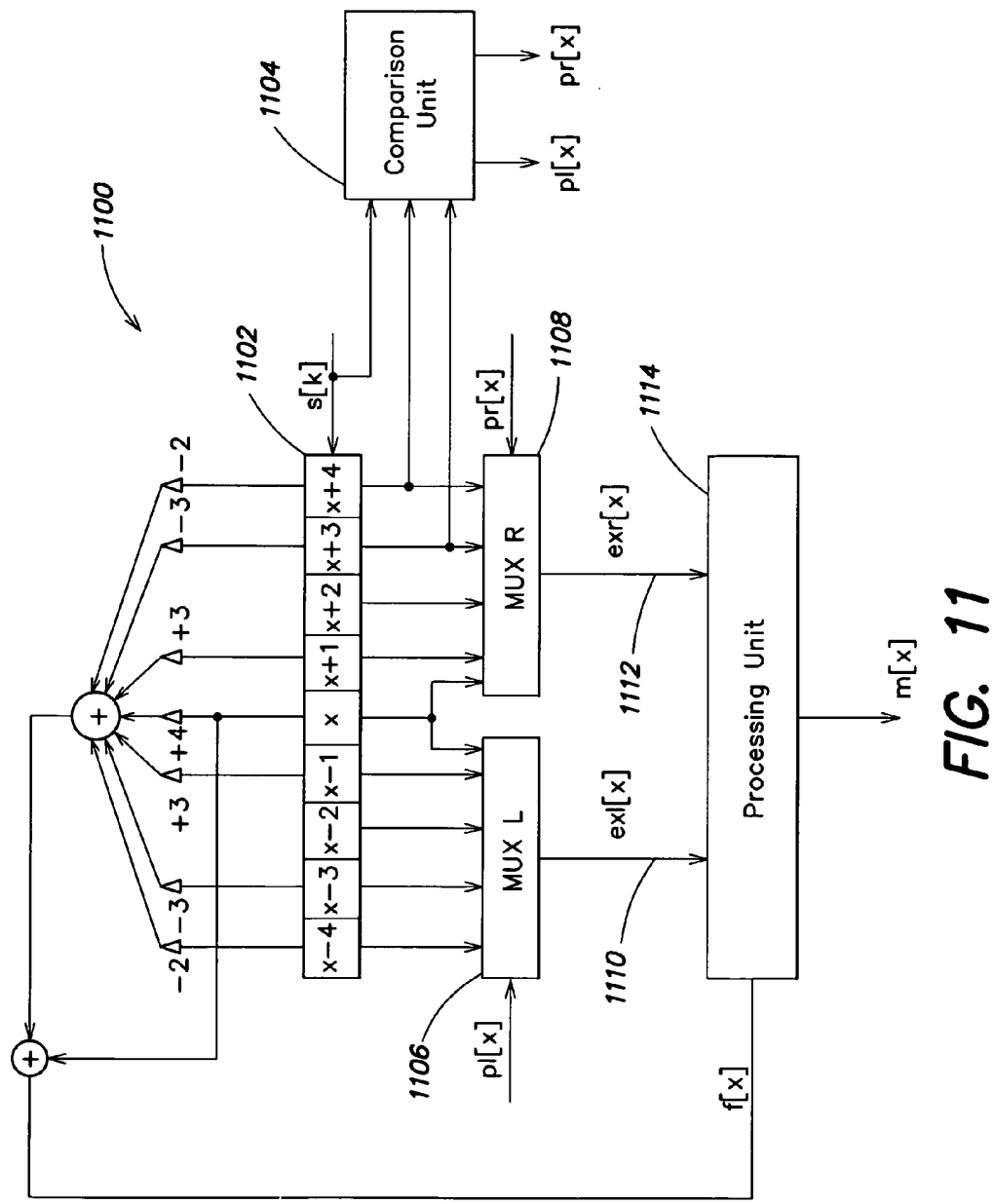
FIG. 11 illustrates an alternative embodiment device for generating a modified picture signal value m[x] for a selected picture signal value s[x].

To avoid multiple comparisons of adjacent signal values, an arrangement 1100 as illustrated in FIG. 11 provides that the two last signal values s[x+3] and s[x+4] stored in shift register 1102 are compared in a comparison unit 1104 with the next value s[x+5] entering the shift register 1102 to determine whether a signal configuration is present in which s[x+4] represents a local extreme. For the remaining signal values s[x−4] . . . s[x+3] which have already undergone this comparison, the result is stored in the comparison unit 1104 of a determination whether s[x] represents a local extreme, or whether one of the values s[x−4] through s[x−1] represents a left local extreme, or one of the values s[x+1] through s[x+4] represents a right local extreme. For each value s[x], the comparison unit 1104 outputs the stored positions of the respective left local extremes pl[x] and right local extremes pr[x]. The position values pl[x], pr[x] are input to associated multiplexers 1106, 1108, respectively, which provide the left local extreme el[x] on a line 1110 and the right local extreme er[x] on a line 1112.

The value f[x] of the peaking signal as well as the right and left extremes exl[x] and exr[x] are applied in a processing unit 1114, which operates similar to unit 410 (FIG. 4) to form modified picture signal m[x].

Advantageously, the apparatus and method of determining a modified picture signal from the picture signal, provides the modified picture signal with steepened slopes relative to the picture signal.

Although the present invention has been shown and described with respect to several preferred embodiments thereof, various changes, omissions and additions to the form and detail thereof, may be made therein, without departing from the spirit and scope of the invention.

What is claimed is:

1. Method for slope enhancement of signal transitions in a television picture which is formed from at least one picture signal s(t), the method comprising:
   generating from the picture signal s(t) a discrete picture signal s(k) having a sequence of picture signal values;
   filtering the discrete picture signal s(k) using a peaking filter H[z] that provides filtered signal f(k), the filtered signal f(k) having for picture signal values s(x), corresponding signal values f(x);
   generating a modified picture signal m(k) having a sequence of signal values in response to the picture signal s(k) and the filtered signal f(k) where the step of generating for each signal value m(x) of the modified picture signal m(k) includes
   selecting a signal value s(x) of the picture signal s(k);
   for the selected signal value s(x) determining a first local extreme el(x) from a sub-sequence of the picture signal s(k) immediately preceding the selected signal value s(x), and determining a second local extreme er(x) from a subsequence of the picture signal s(k) immediately subsequent to the selected signal value s(x); and
   selecting the modified picture signal value (m(x)) from one of either the selected signal value s(x), the first local extreme el(x), the second local extreme er(x) or the filtered signal f(k).

2. Method according to claim 1 in which the modified picture signal value m(x) is set equal to the picture signal value s(x) when the picture signal value s(x) represents a local extreme.

3. Method for slope enhancement of signal transitions in a television picture which is formed from at least one picture signal s(t), the method comprising:
   generating from the picture signal s(t) of a discrete picture signal s(k) having a sequence of picture signal values;
   generating a discrete filter signal f(k) having a sequence of signal values for the time-discrete picture signal value s(k), the filter signal f(k) having, for picture signal values (s(x)), corresponding signal values (f(x));
   generating from the time-discrete picture signal s(k) and the filter signal f(k) of a modified picture signal (m(k)) having a sequence of signal values,
   characterized in that the generation of a signal value (m(x)) of the modified picture signal (m(k)) includes
   selecting a signal value s(x) of picture signal s(k);
   determining at least one local extreme (el(x), er(x)) of a sequence of successive picture signal values containing the selected picture signal value (s(x)); and
   generating the modified picture signal value (m(x)) as a function of the (at least one) local extreme, where the modified picture signal value (m(x)) is the picture signal value (s(x)) when the picture signal value (s(x)) represents a local extreme, and starting with the selected picture signal value (s(x)), a first local extreme (el(x)) is determined from a sequence of picture signal values preceding the selected picture signal value, and in which, starting from the selected picture signal value, a second local extreme (er(x)) of a sequence of picture signal values following the selected television signal value is determined when the selected television signal value (s(x)) does not represent a local extreme, and where the modified television signal value (m(x)) is the filter signal value (f(x)) corresponding to the selected television signal value (s(x)) when the filter signal value (f(x)) lies within an interval defined by the first and second local extreme (el(x), er(x)), and in which the modified television signal value (m(x)) is the value of the first or second local extreme (el(x), er(x)) when the filter signal value (f(x)) lies outside an interval defined by the first and second local extremes (el(x), er(x)).

4. Method according to claim 3, in which the modified television signal value (m(x)) is the first or second local extreme (el(x), er(x)), the value of which is closer to the corresponding filter signal value (f(x)).

5. Method according to claim 3, in which the length of the sequences of television signal values (s(k)), within which the first and second local extremes (el(x), er(x)) are determined, is limited.

6. Method according to claim 3, in which the sequences within which the first local extreme (el(x)) and the second local extreme (er(x)) are determined have an equal number of signal values.

7. Method according to claim 3, in which the sequences within which the first local extreme (el(x)) and the second local extreme (er(x)) are determined each comprise four television signal values.

8. Method according to claim 7, in which the filter signal (f(k)) is formed by raising selected frequency components of the time-discrete television signal (s(k)).

9. A device for increasing the sharpness of a television picture formed from at least one television signal, comprising:
   a sampling device that samples the television signal and provides a discrete-time-television signal (s(k));
   a memory for storing a sequence of successive television signal values (s(x−4) . . . s(x−4);
   a peaking filter responsive to the successive television signal values for providing a filtered signal (f(k));
   means for generating a modified picture signal m(k) having a sequence of signal values in response to the picture signal s(k) and the filtered signal f(k) for each signal value m(x) of the modified picture signal m(k), comprising
   means for selecting a signal value s(x) of the picture signal s(k);
   means for determining a first local extreme el(x) from a sub-sequence of the picture signal s(k) immediately preceding the selected signal value s(x), and for determining a second local extreme er(x) from a subsequence of the picture signal s(k) immediately subsequent to the selected signal value s(x); and
   means for selecting the modified picture signal value m(x) from one of either the selected signal value s(x), the first local extreme el(x), the second local extreme er(x) or the filtered signal.

* * * * *

UNITED STATES PATENT AND TRADEMARK OFFICE
CERTIFICATE OF CORRECTION

PATENT NO. : 7,098,964 B2
APPLICATION NO. : 10/108232
DATED : August 29, 2006
INVENTOR(S) : Rieder et al.

It is certified that error appears in the above-identified patent and that said Letters Patent is hereby corrected as shown below:

Column 2
line 17, before "is a plot" delete "11A" and insert -- 1 A--

Column 9
In the claims, claim 1, line 25, after "s(x)" delete ","
In the claims, claim 3, line 50, after "s(t)" delete "of"
In the claims, claim 3, line 57, after "f(k)" delete "of"
In the claims, claim 3, line 61, before "picture" insert --the--

Column 10
In the claims, claim 5, line 26, before "television" insert --the--
In the claims, claim 9, line 44, delete "discrete-time-television" and insert --discrete-time television--
In the claims, claim 9, line 46, delete "...s(x-4);" and insert --...s(x+4))"--

Signed and Sealed this

Twenty-first Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,098,964 B2  
APPLICATION NO. : 10/108232  
DATED : August 29, 2006  
INVENTOR(S) : Rieder et al.

Page 1 of 1

It is certified that error appears in the above-identified patent and that said Letters Patent is hereby corrected as shown below:

Column 2
line 17, before "is a plot" delete "11A" and insert --1A--

Column 9
In the claims, claim 1, line 25, after "s(x)" delete ","
In the claims, claim 3, line 50, after "s(t)" delete "of"
In the claims, claim 3, line 57, after "f(k)" delete "of"
In the claims, claim 3, line 61, before "picture" insert --the--

Column 10
In the claims, claim 5, line 26, before "television" insert --the--
In the claims, claim 9, line 44, delete "discrete-time-television" and insert --discrete-time television--
In the claims, claim 9, line 46, delete "...s(x-4);" and insert --...s(x+4))"--

Signed and Sealed this

Twenty-sixth Day of December, 2006

JON W. DUDAS  
*Director of the United States Patent and Trademark Office*